United States Patent Office 3,217,037
Patented Nov. 9, 1965

3,217,037
2-HYDROCARBYLTHIO-SULFINYL AND SULFO-NYLALKANAL CARBAMOYLOXIMES
Linwood K. Payne, Jr., Charleston, W. Va., and Mathias H. J. Weiden, Raleigh, N.C., assignors to Union Carbide Corporation, a corporation of New York
No Drawing. Filed Sept. 25, 1962, Ser. No. 226,174
14 Claims. (Cl. 260—566)

This invention relates to novel chemical compounds useful as pesticides and is particularly concerned with carbamate derivatives of substituted aldoximes and their insecticidal, miticidal, and nematocidal activity.

In addition to providing a novel class of chemical compounds, our invention affords insecticidal, miticidal, and nematocidal compositions having activity comparable or superior to the most effective commercially used materials. The miticidal action of our compounds is particularly important in that mites are becoming increasingly troublesome and difficult to control inasmuch as they are often resistant to general insecticides and unaffected by specific insecticides used to control a particular crop pest.

The compounds of our invention generally comprise the basic structure (I)
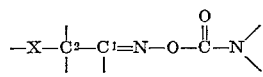

wherein X represents a divalent Group VI element having an atomic number between 7 and 17, in any oxidation state, i.e. where X is oxygen or, preferably sulfur, wherein the sulfur atom can be in any one of its various oxidation states to provide a sulfide, sulffinyl, or sulfonyl linkage. The free valences of structure I, above, are optimally satisfied by hydrogen or hydrocarbyl radicals monovalently bonded through a carbon atom of the radical, and where said hydrocarbyl radicals can be substituted with such groups as halogen, e.g. bromine and chlorine. The said hydrocarbyl radicals can be aliphatic, as in the alkyl, alkenyl, and alkynyl radicals, or cycloaliphatic, as in the cycloalkyl and cycloalkenyl radicals, or aromatic, as in the ary radicals, such as phenyl and naphthyl, or may comprise such radicals in combination as in the aralkyl, e.g. alphyl, alkaryl, cycloalkenyl-alkyl, and the like radicals, and preferably do not contain, individually, in excess of ten carbon atoms.

In a preferred aspect of our invention, the carbon atom of the oxime function, numbered 1 in structure I, above, is substituted with hydrogen and the carbon atom alpha thereto, numbered 2, carries at least one, and preferably two, lower alkyl, e.g. methyl or ethyl groups, while the carbamate nitrogen is substituted with two radicals individually selected from the group consisting of hydrogen and lower alkyl, and preferably where the total number of carbon atoms in such radicals together is not more than ten.

Thus our preferred compounds can be considered as carbamate derivatives of 2-hydrocarbylthio(or oxy)-alkanaldoximes wherein the carbamate nitrogen can be substituted with one or two lower alkyl groups and where the 2-position of the alkanaldoxime moiety is preferably substituted with alkyl and is optimally fully alkylated to provide a high degree of branching on the carbon atom alpha to the oxime function. Such compounds are preferred in our invention in that they exhibit an outstandingly superior degree of insecticidal and miticidal activity.

As specifically exemplary of our novel compounds there can be mentioned the 2-hydrocarbylthiopropionaldehyde N-methylcarbamoyloximes such as 2-methylthiopropionaldehyde N-methylcarbamoyloxime,
2-ethylthiopropionaldehyde N-methylcarbamoyloxime,
2-n-propylthiopropionaldehyde N-methylcarbamoyloxime,
2-isopropylthiopropionaldehyde N-methylcarbamoyloxime,
2-n-butylthiopropionaldehyde N-methylcarbamoyloxime,
2-sec.-butylthiopropionaldehyde N-methylcarbamoyloxime,
2-t-butylthiopropionaldehyde N-methylcarbamoyloxime,
2-isobutylthiopropionaldehyde N-methylcarbamoyloxime,
2-heptylthiopropionaldehyde N-methylcarbamoyloxime,
2-decylthiopropionaldehyde N-methylcarbamoyloxime,
2-vinylthiopropionaldehyde N-methylcarbamoyloxime,
2-(2-propenylthio)propionaldehyde N-methylcarbamoyloxime,
2-(3-butenylthio)propionaldehyde N-methylcarbamoyloxime,
2-hexenylthiopropionaldehyde N-methylcarbamoyloxime,
2-ethynylthiopropionaldehyde N-methylcarbamoyloxime,
2-phenylthiopropionaldehyde N-methylcarbamoyloxime,
2-(α-naphthylthio)propionaldehyde N-methylcarbamoyloxime,
2-benzylthiopropionaldehyde N-methylcarbamoyloxime,
2-(4-chlorophenylthio)propionaldehyde N-methylcarbamoyloxime,
2-(2,4-dichlorophenylthio)propionaldehyde N-methylcarbamoyloxime, and analogous 2-methyl-2-hydrocarbylthiopropionaldehyde N-methylcarbamoyloximes, such as 2-methyl-2-methylthiopropionaldehyde N-methylcarbamoyloxime,
2-methyl-2-ethylthiopropionaldehyde N-methylcarbamoyloxime,
2-methyl-2-n-propylthiopropionaldehyde N-methylcarbamoyl-oxime,
2-methyl-2-isopropylthiopropionaldehyde N-methylcarbamoyl-oxime,
2-methyl-2-butylthiopropionaldehyde N-methylcarbamoyl-oxime,
2-methyl-2-heptylthiopropionaldehyde N-methylcarbamoyl-oxime,
2-methyl-2-decylthioproprionaldehyde N-methylcarbamoyl-oxime,
2-methyl-2-vinylthiopropionaldehyde N-methylcarbamoyl-oxime,
2-methyl-2-(2-propenylthio)propionaldehyde N-methylcarbamoyloxime
2-methyl-2-(3-butenylthio)propionaldehyde N-methylcarbamoyloxime,
2-methyl-2-hexenylthiopropionaldehyde N-methylcarbamoyloxime,
2-methyl-2-ethynylthiopropionaldehyde N-methylcarbamoyloxime,
2-methyl-2-phenylthiopropionaldehyde N-methylcarbamoyloxime,
2-methyl-2-(α-napthylthio)propionaldehyde N-methylcarbamoyloxime,
2-methyl-2-benzylthiopropionaldehyde N-methylcarbamoyloxime,
2-methyl-2-(2-chlorophenylthio)propionaldehyde N-methylcarbamoyloxime,
2-methyl-2-(4-chlorophenylthio)propionaldehyde N-methylcarbamoyloxime,
2-methyl-2-(2,4-dichlorophenylthio)propionaldehyde N-methylcarbamoyloxime, and the like, as well as compounds derived from longer chain alkanaldehydes, for example butyraldehyde, pentanaldehyde, hexanaldehyde, heptanaldehyde, decanaldehyde, etc. as in 2-methylthiobutyraldehyde N-methylcarbamoyloxime,
2-methylthiopentanaldehyde N-methylcarbamoyloxime,
2-methylthiohexanaldehyde N-methylcarbamoyloxime,
2-methylthioheptanaldehyde N-methylcarbamoyloxime,
2-methylthiodecanaldehyde N-methylcarbamoyloxime, and analogous 2-alkyl-2-hydrocarbylthioalkanaldehyde N-methylcarbamoyloxime, such as 2-methyl-2-methylthiobutyraldehyde N-methylcarbamoyloxime,
2-ethyl-2-methylthiobutyraldehyde N-methylcarbamoyloxime,
2-butyl-2-methylthioheptanaldehyde N-methylcarbamoyloxime,
2-octyl-2-methylthiodecanaldehyde N-methylcarbamoyloxime, and the like, wherein the carbon atom alpha to the oxime carbon atom carries two alkyl substituents, each containing up to about 10 and preferably up to 4 carbon atoms.

Further illustrative of compounds within the compass of our invention are those wherein the thio linkage of the above-named compounds is replaced by an oxy linkage or by a sulfinyl linkage or by a sulfonyl linkage as, for example, in the 2-hydrocarbyloxypropionaldehyde N-methylcarbamoyloximes, such as 2-methoxypropionaldehyde N-methylcarbamoyloxime,
2-ethoxypropionaldehyde N-methylcarbamoyloxime,
2-(2-propenoxy)propionaldehyde N-methylcarbamoyloxime,
2-(4-chlorophenoxy)propionaldehyde N-methylcarbamoyloxime,
2-methyl-2-methoxypropionaldehyde N-methylcarbamoyloxime, and the like, and in the 2-hydrocarbylsulfinylpropionaldehyde N-methylcarbamoyloximes, such as 2-methylsulfinylpropionaldehyde N-methylcarbamoyloxime,
2-(2-propenylsulfinyl)propionaldehyde N-methylcarbamoyloxime,
2-(4-chlorophenylsulfinyl)propionaldehyde N-methylcarbamoyloxime,
2-methyl-2-methylsulfinylpropionaldehyde N-methylcarbamoyloxime, and the like, and in the 2-hydrocarbylsulfonylpropionaldehyde N-methylcarbamoyloximes, such as 2-methylsulfonylpropionaldehyde N-methylcarbamoyloxime,
2-(2-propenylsulfonyl)propionaldehyde N-methylcarbamoyloxime,
2(4-chlorophenylsulfonyl)propionaldehyde N-methylcarbamoyloxime,
2-methyl-2-methylsulfonylpropionaldehyde N-methylcarbamoyloxime,
and the like.

While the afore-named compounds are, for purposes of illustration, N-methylcarbamoyloximes, the carbamate nitrogen of our compounds can be unsubstituted as in the simple carbamoyloximes, or can carry a single alkyl substituent other than methyl, as in the N-ethyl, N-n-propyl, N-isopropyl, N-n-butyl, N-isobutyl, N-sec-butyl, N-t-butyl, N-heptyl, and N-decylcarbamoyloximes, and the like N-monoloweralkylcarbamoyloximes of our invention, or can carry two lower alkyl substituents as in the N,N-dimethyl, N-methyl-N-ethyl, N,N-diethyl, N-methyl-N-n-propyl, N-methyl-N-isopropyl, N,N-di-n-propyl, N,N-disopropyl, N-methyl-N-t-butyl, N,N-di-t-butylcarbamoyloxime, and the like N,N-diloweralkylcarbamoyloximes of our invention.

The preferred compounds of this invention can be graphically depicted by the following general formula:

(II) 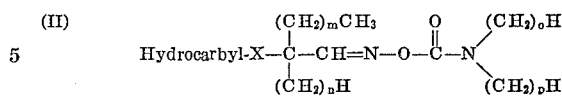

wherein X is oxygen, sulfur, sulfinyl, or sulfonyl, and $m$, $n$, $o$, and $p$ are integers from 0 to 10 inclusive, and are preferably such that the sum of $m$ and $n$ is no greater than 5 and that the sum of $o$ and $p$ is no greater than 4. When said integers are larger than 2, it is understood that $—(CH_2)_m—$, $—(CH_2)_n—$, $—(CH_2)_o—$, and $—(CH_2)_p—$ can represent either straight-chain or branched-chain alkylene radicals. Most advantageously, the hydrocarbyl moiety of Formula II, above, is acyclic hydrocarbyl, i.e. as in alkyl, alkenyl, and alkynyl optimally containing no more than 7 carbon atoms.

The compounds of this invention can be prepared in a variety of ways from the corresponding oximes. One synthetic route involves the reaction of the corresponding oxime with phosgene to form the chloroformate which, in turn, is reacted with a suitably substituted amine to give the desired carbamoyloxime compound of this invention. The synthesis is illustrated by the following general equations, wherein X, $m$, $n$, $o$ and $p$ are defined as before:

(1) 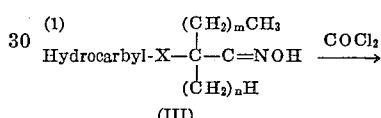

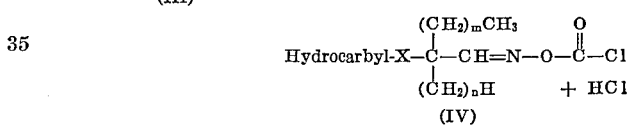

(2) 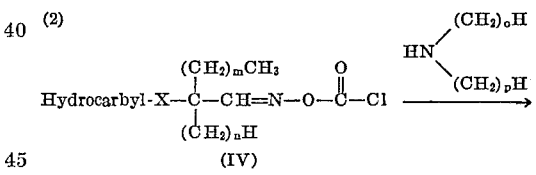

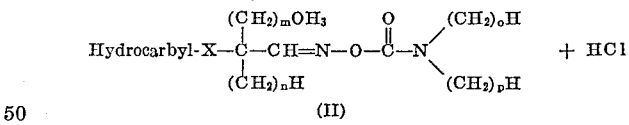

In step (1), above, a solution of the oxime compound (III) in e.g., ethyl ether is conveniently added slowly to a solution of phosgene in toluene or ethyl ether or other suitable organic solvent in the presence of an HCl acceptor such as a suitable amine, e.g. dimethyl aniline. The reaction can be carried out at from —30° C. to about 40° C. but will generally be found to proceed most advantageously between 10° C. and room temperature. Below 10° C. the reaction is somewhat sluggish and if the temperature is allowed to rise substantially above 40° C., considerable quantities of nitrile from the dehydration of the oxime compound will appear in the reaction mixture. The reaction is slightly exothermic so that some external cooling is usually necessary to maintain the temperature within the desired range. The reaction mixture can be washed with water to remove the amine hydrochloride and the organic layer containing the chloroformate (IV) can be used for further reactions. The addition of the amine, step (2) above, is carried out in the presence of solvents for the amine, such as water, dioxane, toluene, or chloroform, at temperatures between about —40° C. and about 80° C. and preferably below about 40° C. inasmuch as the reaction proceeds smoothly even at low temperatures and is so rapid above 40° C.

that loss of low boiling amines may occur and some decomposition may take place.

An alternative synthetic procedure for making the N-monoloweralkylcarbamoyloxime compounds of this invention involves addition of a suitably substituted isocyanate to the oxime (III) corresponding to the desired compound and is illustrated as follows:

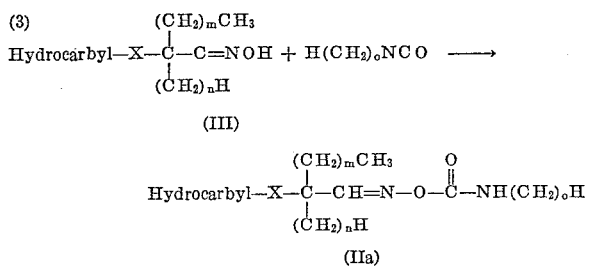

The isocyanate addition can be carried out, generally, by contacting the oxime (III) with the isocyanate in an inert organic solvent, and preferably in the presence of a tertiary amine or organotin catalyst. The reaction may be effected at temperatures ranging from about 10° C. to about 130° C. and is preferably carried out between room temperature and 80° C. Generally, temperatures in excess of about 130° C. are to be avoided in view of the temperature sensitivity of the product carbamoyloxime. The operating pressure may range from about 1 atmosphere to about 10 atmospheres, preferably from about 2 to about 3 atmospheres, and is dependent upon the concentration and vapor pressure of the volatile isocyanate at the reaction temperature. The inert organic solvents that can be employed in the reaction are those inert to isocyanates in general, i.e. those free of radicals such as hydroxy or amino radicals. Illustrative solvents are aliphatic and aromatic hydrocarbons, such as hexane, heptane, octane, benzene, toluene, and the like, and ethers such as diethyl ether, ethyl propyl ether, and the like. The reaction is preferably carried out in the presence of a tertiary amine or organotin catalyst. The term "organotin catalyst" as used herein is meant to refer to such compounds as dibutyltin diacetate, dibutyltin dichloride, dibutyltin dimethoxide, dibutyltin dilaurate, dibutyltin maleate, dibutyltin di-2-ethylhexenoate, stannous octanoate, stannous oleate, and the like. Generally, amounts of said catalyst from about 0.1 to about 1.0 weight percent of the starting material comprised of methyl isocyanate and the oxime are sufficient. The mol ratio of methyl isocyanate to oxime can range from about 0.25:1 to about 2:1, but preferably an equimolar amount or slight excess of methyl isocyanate is employed to insure that the oxime is completely reacted. The reaction time may vary from about 5 minutes to about 7 days, but normally, when operating in the preferred temperature range, reaction times of from about one-half hour to about five hours are sufficient for complete reaction.

The carbamoyloxime product formed, either a solid or oily liquid, can be recovered from the reaction mixture by means known to the art, e.g., by vacuum-distillation to drive off solvent and excess isocyanate.

The oxime compounds used as starting materials in both of the above-described alternative synthetic procedures are themselves prepared from the corresponding azodioxy-coupled nitrosochloride dimers by simultaneous thermal rearrangement to the oxime and replacement of the chlorine atom by the nucleophilic hydrocarbyl-X'H where X' is —S— or —O—, in the presence of an HCl acceptor, e.g. sodium hydroxide in stoichiometric amount. The nitrosochloride dimers are, in turn, prepared by the addition of nitrosyl chloride to a suitable olefin by well-known procedures, for example, as taught by K. A. Ogloblin in J. Gen. Chem. (U.S.S.R.), 22, 2175 (1952).

The reaction sequence is illustrated as follows:

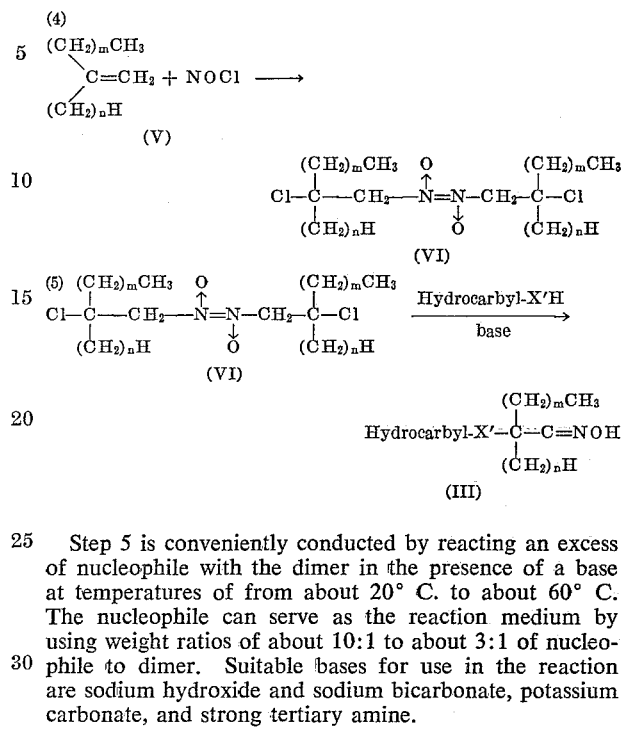

Step 5 is conveniently conducted by reacting an excess of nucleophile with the dimer in the presence of a base at temperatures of from about 20° C. to about 60° C. The nucleophile can serve as the reaction medium by using weight ratios of about 10:1 to about 3:1 of nucleophile to dimer. Suitable bases for use in the reaction are sodium hydroxide and sodium bicarbonate, potassium carbonate, and strong tertiary amine.

The sulfinyl- and sulfonyl-linked compounds of our invention are prepared by oxidizing the corresponding sulfide-linked compound with dilute solutions of peracetic acid.

It will be understood that the above description is illustrative and that modifications in the procedures used will occur to those skilled in the art, depending on the specific starting materials used.

The following examples are illustrative.

EXAMPLE I

2-methyl-2-methylthiopropionaldehyde N-methylcarbamoyloxime

To a solution of 3.68 grams (0.16 mole) of sodium in anhydrous ethanol was added 8 grams (0.17 mole) of methyl mercaptan. The resulting sodium mercaptide was then treated with 19.5 grams (0.16 mole) of 2-chloro-2-methyl-1-nitrosopropane dimer dissolved in hot ethanol. The resulting mixture was heated at reflux for five hours, cooled and filtered. The filtrate was evaporated under reduced pressure and the residue dissolved in diethyl ether. The ether solution was filtered and the solvent removed by distillation. Distillation of the residue in vacuo yielded 15 grams of a clear liquid which, upon redistillation afforded 10 grams of a colorless oil, 2-methyl-2-methylthiopropionaldoxime which had a boiling point of 78–81° C./5 mm. and analyzed as follows:

|  | Percent C | Percent H | Percent N |
|---|---|---|---|
| Calculated for $C_5H_{11}NOS$ | 45.08 | 8.33 | 10.52 |
| Found | 45.89 | 8.19 | 10.64 |

To the thus-prepared oxime dissolved in acetone was added an equivalent amount of methyl isocyanate and 2 drops of dibutyltin diacetate. The resulting solution was stirred and heated at reflux for four hours. The solvent was removed in vacuo and the residue recrystallized from isopropyl ether to yield a white crystalline solid, 2 - methyl - 2 - methylthiopropionaldehyde N-methylcarbamoyloxime, which, upon further purification, had a melting point of 95° C. and analyzed as follows:

|  | Percent C | Percent H | Percent N |
|---|---|---|---|
| Calculated for $C_7H_{14}N_2O_2S$ | 44.20 | 7.42 | 14.72 |
| Found | 44.07 | 7.45 | 14.51 |

EXAMPLE II

*2-methyl-2-methylsulfinylpropionaldehyde N-methylcarbamoyloxime*

To 9 grams (0.0475 mole) of 2-methyl-2-methylthiopropionaldehyde N-methylcarbamoyloxime dissolved in 50 milliliters of ethyl acetate was added 17.5 grams of a 20.6 percent solution of peracetic acid in ethyl acetate (0.0475 mole of peracetic acid). The acid was added over a period of thirty minutes while stirring and maintaining the reaction temperature at 32–37° C. by gentle cooling. After standing for 16 hours at room temperature, the pale green solution was diluted to 500 milliliters with hexane and cooled to −10° C. The resulting solid was collected by filtration, stirred with hot isopropyl ether and again filtered. The precipitate weighed 9 grams and melted at 99–102° C. When recrystallized from benzene-ethylacetate (~95:5) the melting point was raised to 108–110° C. The pure compound had an infrared spectrum which was consistent with the proposed structure and analyzed as follows:

|  | Percent C | Percent H | Percent N |
|---|---|---|---|
| Calculated for $C_7H_{14}N_2O_3S$ | 40.8 | 6.8 | 13.6 |
| Found | 40.5 | 6.6 | 13.1 |

EXAMPLE III

*2-methyl-2-methylsulfonylpropionaldehyde N-methylcarbamoyloxime*

To 9.5 grams of 2-methyl-2-methylthiopropionaldehyde N-methylcarbamoyloxime (0.05 mole) in 50 milliliters of ethyl acetate was added 35.6 grams of a 21.2 percent solution of peracetic acid in ethyl acetate (0.1 mole of peracetic acid). The temperature of the well-stirred reaction medium was maintained at 25–30° C. with cooling while the peracetic acid solution was added over a forty-five minute period. The reaction mixture was then allowed to stand for sixteen hours. The resulting solid was collected by filtration and recrystallized from ethyl acetate. There was obtained 7 grams of a white crystalline solid which had a melting point of 132–133° C. and analyzed as follows:

|  | Percent C | Percent H | Percent N |
|---|---|---|---|
| Calculated for $C_7H_{14}N_2O_4S$ | 37.8 | 6.3 | 12.6 |
| Found | 38.3 | 6.2 | 13.2 |

EXAMPLE IV

*2-methyl-2-methoxypropionaldehyde N-methylcarbamoyloxime*

2-methyl-2-methoxypropionaldehydeoxime was prepared by reacting 2-methyl-2-chloro-1-nitrosopropane dimer with a large excess of methanol in the presence of sodium bicarbonate at 40° for two hours. The mixture was filtered, the solvent evaporated and the residue extracted with hot petroleum ether and filtered. Removal of the petroleum ether and subsequent distillation of the residue gave 10.5 grams of the desired oxime which had a boiling point of 85° C./15 mm. To 10.5 grams (0.09 mole) of the oxime in 100 milliliters of dry acetone was added 5 grams (0.09 mole) of methylisocyanate and 2 drops of dibutyltin diacetate. The solution was stirred and heated at reflux for four hours. The solvent was removed in vacuo and the residue recrystallized from isopropyl ether to give 8 grams of a white solid, having a melting point of 70–73° C. and the following analysis:

|  | Percent C | Percent H | Percent N |
|---|---|---|---|
| Calculated for $C_7H_{14}N_2O_3$ | 48.26 | 8.1 | 16.08 |
| Found | 48.21 | 7.94 | 16.46 |

EXAMPLE V

*2-methylthiopropionaldehyde N-methylcarbamoyloxime*

To 5.5 grams of 85 percent potassium hydroxide (.084 mole) dissolved in 100 milliliters of ethanol was added 5.76 grams (0.12 mole) of methanethiol. The mixture was stirred for fifteen minutes at 25° C. and then 9 grams (0.084 mole) of 2-chloro-1-nitrosopropane dimer was added in small portions through a powder funnel. The temperature was maintained at 30–35° C. during the addition of the dimer by occasional cooling and then heated at 35° C. for an additional hour. The solvent was evaporated and the residue extracted with ethyl ether. The ether solution containing the crude 2-methyl-2-methylthiopropionaldehyde oxime was then treated with 5.7 grams (0.1 mole) of methyl isocyanate and one drop of dibutyltin diacetate. It was allowed to stand in a closed container for twenty-four hours, filtered and stripped to 55° C./2 mm. The residual oil, 2-methylthiopropionaldehyde N-methylcarbamoyloxime had an infra-red spectrum consistent with the proposed structure and analyzed as follows:

|  | Percent C | Percent H |
|---|---|---|
| Calculated for $C_6H_{12}N_2O_2S$ | 40.9 | 6.9 |
| Found | 40.7 | 6.9 |

EXAMPLE VI

*2-methyl-2-isopropylthiopropionaldehyde N-methylcarbamoyloxime*

2-methyl-2-isopropylthiopropionaldehyde oxime was prepared from 15.2 grams (0.2 mole) of 2-propanethiol, 8 grams (0.2 mole) of sodium hydroxide and 24.3 grams (0.2 mole) of 2-chloro-2-methyl-1-nitrosopropane dimer. The yield was 20 grams and the colorless oil distilled at 74–76° C./2 mm.

To 14 grams (0.087 mole) of the oxime dissolved in 100 milliliters of anhydrous ethyl ether was added 2 drops of dibutyltin diacetate and 5.1 grams (0.09 mole) of methyl isocyanate. The mixture was heated at 35° C. for two hours and allowed to stand overnight at room temperature. Evaporation of the solvent yielded a solid which, when recrystallized from isopropyl ether, weighed 10 grams and melted at 90–92° C. and analyzed as follows:

|  | Percent C | Percent H | Percent N |
|---|---|---|---|
| Calculated for $C_9H_{18}N_2O_2S$ | 49.5 | 8.3 | 12.8 |
| Found | 49.9 | 8.4 | 12.8 |

EXAMPLE VII

*2-methyl-2-(2-propenylthio)propionaldehyde N-methylcarbamoyloxime*

To 13.2 grams of 85 percent potassium hydroxide (0.2 mole) dissolved in 100 milliliters of ethyl alcohol was added 18.5 grams (0.25 mole) of allyl mercaptan. The mixture was stirred at 30° C. for thirty minutes and then 24.3 grams of 2-chloro-2-methyl-1-nitrosopropane dimer was added in small portions. External cooling was required to maitnain the temperature at 30–35° C. The mixture was allowed to stand at room temperature for two days, filtered, the solvent evaporated and the residue distilled. There was obtained 27 grams of 2-methyl-2-allylthiopropionaldehyde oxime as a colorless oil having a boiling point of 75–77° C./1 mm. To 20 grams of the oxime (0.125 mole) dissolved in 100 milliliters of anhydrous ethyl ether was added 7.5 grams of methyl isocyanate (0.13 mole) in the presence of dibutyltin diacetate and the reaction mixture was allowed to stand for three days. The solvent was evaporated and the solid residue recrystallized from isopropyl ether and washed with hexane. There was obtained 9 grams of 2-methyl-2-(2-propenylthio)propionaldehyde N-methylcarbamoyloxime having a melting point of 74–76° C. and the following analysis:

|  | Percent C | Percent H | Percent N |
| --- | --- | --- | --- |
| Calculated for $C_9H_{16}N_2O_2S$ | 50.0 | 7.5 | 13.0 |
| Found | 49.9 | 8.0 | 12.6 |

EXAMPLE VIII

*2-methyl-2-phenylthiopropionaldehyde N-methylcarbamoyloxime*

2-methyl-2-phenylthiopropionaldehyde oxime was obtained by allowing an alcohol solution of the potassium salt of benzenethiol to react with 2-chloro-2-methyl-1-nitrosopropane dimer. It is a white solid which melts at 82–85° C. when recrystallized from a small amount of isopropyl ether. Seventeen grams (0.087 mole) of this oxime was treated with 5.2 grams of methyl isocyanate (0.09 mole) at room temperature for twenty-four hours. The solution was filtered and the solvent evaporated. The residue was purified by recrystallization from a toluene-hexane mixture yielding 10 grams of the desired 2-methyl-2-phenylthiopropionaldehyde N - methylcarbamoyloxime, which had a melting point of 78–84° C. and analyzed as follows:

|  | Percent C | Percent H | Percent N |
| --- | --- | --- | --- |
| Calculated for $C_{12}H_{16}N_2O_2S$ | 57.1 | 6.4 | 11.1 |
| Found | 57.4 | 6.7 | 11.1 |

EXAMPLE IX

*2-methyl-2-methylthiopropionaldehyde N,N-dimethylcarbamoyloxime*

To 22 grams (0.22 mole) of phosgene and 24 grams (0.22 mole) of N,N-dimethylaniline dissolved in 200 milliliters of anhydrous diethyl ether was added dropwise 27 grams (0.20 mole) of 2-methyl-2-methylthiopropionaldehydeoxime in 200 milliliters of ether while stirring and maintaining the reaction temperature at 0–10° C. The reaction mixture was stirred about two hours at this temperature and the dimethylaniline hydrochloride removed by filtration. The filtrate was concentrated in vacuo to about 250 milliliters. It was then treated with 27 grams (0.6 mole) of dimethylamine in 250 milliliters of water while stirring vigorously at 0° C. The mixture was stirred at this temperature for thirty minutes and the ether layer separated. Evaporation of the ether yielded a white solid which was recrystallized from hexane and air dried to give 22 grams of 2-methyl-2-methylthiopropionaldehyde N,N-dimethylcarbamoyloxime (54 percent of theory) which had a melting point of 47° C. and analyzed as follows:

|  | Percent C | Percent H |
| --- | --- | --- |
| Calculated for $C_8H_{16}NO_2S$ | 47.0 | 7.9 |
| Found | 46.9 | 7.9 |

EXAMPLE X

*2-methyl-2-methylthiopropionaldehyde N-ethylcarbamoyloxime*

To 20 grams (0.15 mole) of 2-methyl-2-methylthiopropionaldehyde oxime dissolved in 200 milliliters of anhydrous diethyl ether was added 1 drop of dibutyltin diacetate catalyst and 11 grams (0.155 mole) of ethyl isocyanate dropwise. When all of the isocyanate had been added, the solution was stirred at 35° C. for sixteen hours. The solvent was evaporated under reduced pressure and the residue washed with petroleum ether. Recrystallization from isopropyl ether afforded 18 grams (59 percent of theory) of a white crystalline solid, 2-methyl-2-methylthiopropionaldehyde N-ethylcarbamoyloxime which had a melting point of 84° and analyzed as follows:

|  | Percent C | Percent H | Percent N |
| --- | --- | --- | --- |
| Calculated for $C_8H_{16}N_2O_2S$ | 47.1 | 7.9 | 13.7 |
| Found | 47.6 | 8.1 | 13.8 |

The compounds of our invention are useful as pesticides, particularly as insecticides, miticides, and nematocides.

A particularly important attribute of our compounds is their excellent general insecticidal action coupled with their outstanding control of mites.

With the advent of new highly effective insecticides used against specific crop pests, there has been caused in many cases an unbalance of minor pests of the same crop. For example, plant-feeding mites are often resistant to general insecticides and substantially unaffected by insecticides used to kill a specific insect. Thus the natural predators of plant-feeding mites have been eradicated and the mites, unaffected by the chemicals used, have replaced them as the ecological dominant in the particular pathological environment. Hence, there has been a need for effective miticides and, ideally, chemicals exhibiting both insecticidal and miticidal action.

As representative of our invention the following compounds were tested with regard to their pesticidal activity.

Compound 1:

2-methyl-2-methylthiopropionaldehyde
N-methylcarbamoyloxime
Melting point: 98–100° C.

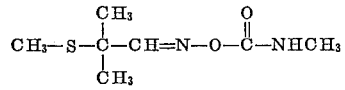

Compound 2:

2-methyl-2-methylsulfinylpropionaldehyde
N-methylcarbamoyloxime
Melting point: 108–110 C.

$$CH_3-\overset{O}{\underset{\uparrow}{S}}-\underset{\underset{CH_3}{|}}{\overset{CH_3}{\underset{|}{C}}}-CH=N-O-\overset{O}{\overset{\|}{C}}-NHCH_3$$

Compound 3:

2-methyl-2-methylsulfonyl-propionaldehyde
N-methylcarbamoyloxime
Melting point: 132–133° C.

$$CH_3-\overset{O}{\underset{\underset{O}{\downarrow}}{\overset{\uparrow}{S}}}-\underset{\underset{CH_3}{|}}{\overset{CH_3}{\underset{|}{C}}}-CH=N-O-\overset{O}{\overset{\|}{C}}-NHCH_3$$

Compound 4:

2-methyl-2-methoxypropionaldehyde N-methyl-
carbamoyloxime
Melting point: 70–73° C.

$$CH_3-O-\underset{\underset{CH_3}{|}}{\overset{CH_3}{\underset{|}{C}}}-CH=N-O-\overset{O}{\overset{\|}{C}}-NHCH_3$$

Compound 5:

2-methylthiopropionaldehyde N-methyl-
carbamoyloxime $$CH_3-S-\underset{\underset{CH_3}{|}}{CH}-CH=N-O-\overset{O}{\overset{\|}{C}}-NHCH_3$$

2-methyl-2-methylthiobutanaldehyde
N-methylcarbamoyloxime
Melting point: 68–70° C.

Compound 6:

2-methyl-2-methylthiobutanaldehyde
N-methylcarbamoyloxime
Melting point: 68–70° C.

$$CH_3-S-\underset{\underset{C_2H_5}{|}}{\overset{CH_3}{\underset{|}{C}}}-CH=N-O-\overset{O}{\overset{\|}{C}}-NHCH_3$$

Compound 7:

2-methyl-2-ethylthiopropionaldehyde
N-methylcarbamoyloxime
Melting point: 78–80° C.

$$C_2H_5-S-\underset{\underset{CH_3}{|}}{\overset{CH_3}{\underset{|}{C}}}-CH=N-O-\overset{O}{\overset{\|}{C}}-NHCH_3$$

Compound 8:

2-methyl-2-isopropylthiopropionaldehyde
N-methylcarbamoyloxime
Melting point: 90–92° C.

$$\underset{CH_3}{\overset{CH_3}{\diagdown}}CH-S-\underset{\underset{CH_3}{|}}{\overset{CH_3}{\underset{|}{C}}}-CH=N-O-\overset{O}{\overset{\|}{C}}-NHCH_3$$

Compound 9:

2-methyl-2-(2-propenylthio)propionaldehyde
N-methylcarbamoyloxime
Melting point: 74–76° C.

$$H_2C=CH-CH_2-S-\underset{\underset{CH_3}{|}}{\overset{CH_3}{\underset{|}{C}}}-CH=N-O-\overset{O}{\overset{\|}{C}}-NHCH_3$$

Compound 10:

2-methyl-2-phenylthiopropionaldehyde
N-methylcarbamoyloxime
Melting point: 78–84° C.

$$\text{C}_6\text{H}_5-S-\underset{\underset{CH_3}{|}}{\overset{CH_3}{\underset{|}{C}}}-CH=N-O-\overset{O}{\overset{\|}{C}}-NHCH_3$$

Compound 11:

2-methyl-2-(p-chlorophenylthio)propionaldehyde
N-methylcarbamoyloxime
Melting point: 44–49° C.

$$Cl-\text{C}_6\text{H}_4-S-\underset{\underset{CH_3}{|}}{\overset{CH_3}{\underset{|}{C}}}-CH=N-O-\overset{O}{\overset{\|}{C}}-NHCH_3$$

Compound 12:

2-methyl-2-benzylthiopropionaldehyde
N-methylcarbamoyloxime $$\text{C}_6\text{H}_5-CH_2-S-\underset{\underset{CH_3}{|}}{\overset{CH_3}{\underset{|}{C}}}-CH=N-O-\overset{O}{\overset{\|}{C}}-NHCH_3$$

Compound 13:

2-methyl-2-methylthiopropionaldehyde
Carbamoyloxime
Melting point: 91–93° C.

$$CH_3-S-\underset{\underset{CH_3}{|}}{\overset{CH_3}{\underset{|}{C}}}-CH=N-O-\overset{O}{\overset{\|}{C}}-NH_2$$

Compound 14:

2-methyl-2-methylthiopropionaldehyde
N,N-dimethylcarbamoyloxime
Melting point: 45–47° C.

$$CH_3-S-\underset{\underset{CH_3}{|}}{\overset{CH_3}{\underset{|}{C}}}-CH=N-O-\overset{O}{\overset{\|}{C}}-N\underset{CH_3}{\overset{CH_3}{\diagdown}}$$

Compound 15:

2-methyl-2-methylthiopropionaldehyde
N-ethylcarbamoyloxime
Melting point: 82–84° C.

$$CH_3-S-\underset{\underset{CH_3}{|}}{\overset{CH_3}{\underset{|}{C}}}-CH=N-O-\overset{O}{\overset{\|}{C}}-N\underset{CH_2CH_3}{\overset{H}{\diagdown}}$$

Compound 16:

2-methyl-2-methylthiopropionaldehyde
N-n-propylcarbamoyloxime
Melting point: 71–73° C.

$$CH_3-S-\underset{\underset{CH_3}{|}}{\overset{CH_3}{\underset{|}{C}}}-CH=N-O-\overset{O}{\overset{\|}{C}}-N\underset{CH_2-CH_2-CH_3}{\overset{H}{\diagdown}}$$

Unless otherwise noted, suspensions of Compounds 1–15 were prepared by dissolving one gram of compound in 50 milliliters of acetone in which had been dissolved 0.1 gram (10 percent of the weight of compound) of "Triton X–155," an alkylphenoxy polyethoxyethanol surfactant, as an emulsifying or dispersing agent. The resulting solution was mixed into 150 milliliters of water to give roughly 200 milliliters of a suspension containing the compound in finely divided form. The thus-prepared stock suspension contained 0.5 percent by weight of compound. The test concentrations employed in the tests described hereinbelow were obtained by diluting the stock suspension with water.

The compounds were evaluated for activity against the following representative pests: bean aphid, armyworm, Mexican bean beetle, house fly, two-spotted mite, and root-knot nematode.

The tests employed were:

Aphid foliage spray test

Adults and nymphal stages of the bean aphid (*Aphis fabae* Scop.), reared on potted dwarf nasturtium plants at 65–70° F. and 50–70 percent relative humidity, constituted the test insects. For testing purposes, the number of aphids per pot was standardized to 100–150 by trimming plants containing excess aphids. The test compounds were formulated by diluting the stock suspension with water to give a suspension containing 100 parts of test compound per million parts of final formulation, by weight. The potted plants (one pot per compound tested), infested with 100–150 aphids, were placed on a revolving turntable and sprayed with 100–110 milliliters of test compound formulation by use of a DeVilbiss spray gun set at 40 p.s.i.g. air pressure. This application, which lasted 30 seconds, was sufficient to wet the plants to runoff. As a control, 100–110 milliliters of a water acetone emulsifier solution containing no test compound were also sprayed on infested plants. After spraying, the pots were placed on their sides on a sheet of white standard mimeograph paper which had been previously ruled to facilitate counting. Temperature and humidity in the test room during the 24-hour holding period were 65–70° F. and 50–70 percent, respectively. Aphids which fell onto the paper and were unable to remain standing after being uprighted were considered dead. Aphids remaining on the plants were observed closely for movement and those which were unable to move the length of the body upon stimulation by prodding were considered dead. Each compound was rated according to the following numerical designations:

5=80—100% mortality
3=40–79% mortality
1=0–39% mortality

Armyworm leaf dip test

Larvae of the southern armyworm (*Prodenia eridania*, (Cram.)), reared on tendergreen bean plants at a temperature of 80±5° F. and a relative humidity of 50±5 percent, constituted the test insects. The test larvae were removed from the colony and held without food for four hours prior to the test. The test compounds were formulated by diluting the stock suspension with water to give a suspension containing 1000 parts of test compound per million parts of final formulation (by weight). Paired seed leaves, excised from tendergreen bean plants, were dipped in the test formulations until thoroughly wetted, excess liquid being removed by gentle shaking. While the leaves were drying in a ventilated hood, wilting was prevented by placing the stems in water. When dry, the paired leaves were separated and each one was placed in a 9-centimeter Petri dish lined with moistened filter paper. Four randomly selected larvae were introduced into each dish and the dishes were closed. The closed dishes were labeled and held at 80–85° F. for three days. Although the larvae could easily consume the whole leaf within twenty-four hours, no more food was added. Larvae which were unable to move the length of the body, even upon stimulation by prodding, were considered dead. Each compound was rated according to the following designations:

5=80—100% mortality
3=40–79% mortality
1=0–39% mortality

Mexican bean beetle leaf dip test

Third instar larvae of the Mexican bean beetle (*Epilachna varivestis*, Muls.), reared on tendergreen bean plants at a temperature of 80±5° F. and 50±5 percent relative humidity, were the test insects. The test compounds were formulated by diluting the stock suspension with water to give a suspension containing 100 parts of test compound per million parts of final formulation by weight. Paired seed leaves excised from tendergreen bean plants were dipped in the test formulation until thoroughly wetted, excess liquid being removed by gentle shaking. While the leaves were drying under a hood, wilting was prevented by placing the stems in water. When dry, the paired leaves were separated and each was placed in a 9-centimeter Petri dish lined with moistened filter paper. Four randomly selected larvae were introduced into each dish, and the dishes were closed. The closed dishes were labeled and held at a temperature of 80±5° F. for three days. Although the larvae could easily consume the leaf within 24 to 48 hours, no more food was added. Larvae which were unable to move the length of the body, even upon stimulation, were considered dead. Each compound was rated according to the following designations:

5=80–100% mortality
3=40–79% mortality
1=10–39% mortality

Mexican bean beetle systemic test

Fourth instar larvae of the Mexican bean beetle (*Epilachna varivestis*, Muls.), reared on tendergreen bean plants at a temperature of 80±5° F. and 50±5 percent relative humidity, were the test insects. The test compounds were formulated by diluting the stock suspension with water to give a suspension containing 250 parts of test compound per million parts of final formulation, by weight. For each test compound, the stems of excised tendergreen bean plants having paired seed leaves were placed in the test formulation for forty-eight hours. The paired leaves were then separated and each leaf was placed in a 9-centimeter Petri dish lined with moistened filter paper. Four randomly selected larvae were placed in the dish and the dish was closed. The closed dishes were labeled and held at 80±5° F. for three days. Although the larvae could easily consume the whole leaf within 24 to 48 hours, no more food was added. Larvae which were unable to move the length of the body, even upon stimulation, were considered dead. Each compound was rated according to the following designations:

5=80–100% mortality
3=40–79% mortality
1=0–39% mortality

Fly bait test

Four to six day old adult house flies (*Musca domestica*, L.), reared according to the specifications of the Chemical Specialties Manufacturing Association (Blue Book, MacNair-Dorland Co., N.Y. 1954: pages 243–244, 261) under controlled conditions of 80±5° F. and 50±5 percent relative humidity, were the test insects. The flies were immobilized by anesthetizing with carbon dioxide and twenty-five immobilized individuals, males and females, were transferred to a cage consisting of a standard food strainer about five inches in diameter which was inverted over blotting paper. The test compounds were formulated by diluting the stock suspension with a 10 percent (by weight) sugar solution to give a suspension containing 1000 parts of test compound per million parts of final formulation, by weight. Fifteen milliliters of the test formulation were added to a souffle cup containing a one-inch square of an absorbent pad. This bait cup was introduced and centered on the blotting paper under the food strainer prior to admitting the flies. The caged flies were allowed to feed on the bait for twenty-hours, at a temperature of 80±5° F. and the relative humidity of 50±5 percent. Flies which showed no sign of movement on prodding were considered dead. Each compound was rated according to the following designations:

5=80–100% mortality
3=40–79% mortality
1=0–39% mortality

*Mite foliage spray test*

Adults and nymphal stages of the two-spotted mite (*Tetranychus telarius* (L.)), reared on tendergreen bean plants at 80±5° F. and 50±5 percent relative humidity, were the test organisms. Infested leaves from a stock culture were placed on the primary leaves of two bean plants six to eight inches in height, growing in a two-and-a-half inch clay pot. 150–200 mites, a sufficient number for testing, transferred from the excised leaves to the fresh plants in a period of twenty-four hours. Following the twenty-four hour transfer period, the excised leaves were removed from the infested plants. The test compounds were formulated by diluting the stock suspension with water to give a suspension containing 1000 parts of test compound per million parts of final formulation. The potted plants (one pot per compound) were placed on a revolving turntable and sprayed with 100–110 milliliters of test compound formulation by use of a DeVilbiss spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants. The sprayed plants were held at 80±5° F. and 50±5 percent relative humidity for six days, after which a mortality count of motile forms was made. Microscopic examination for motile forms was made on the leaves of the test plants. Any individual which was capable of locomotion upon prodding was considered living. Each compound was then rated according to the following designations:

5=80–100% mortality
3=40–79% mortality
1=0–39% mortality

*Mite ovicide test*

The test organism was the egg of the two-spotted mite (*Tetranychus telarius* (L.)), as obtained from adults reared on tendergreen bean plants under controlled conditions of 80±5° F. and 50±5 percent relative humidity. Heavily infested leaves from a stock culture were placed on the primary leaves of two bean plants six to eight inches in height, growing in a two-and-a-half inch clay pot. Females were allowed to oviposit for a period of 48 hours and then the leaves of the infested plants were dipped in a solution containing 800 parts of tetraethyl pyrophosphate per million parts of water in order to destroy the reproductory forms and thus prevent further egg laying. This solution of tetraethyl pyrophosphate does not affect the viability of the eggs. The plants were allowed to dry thoroughly. The test compounds were formulated by diluting the stock suspension with water to give a suspension containing 1000 parts of test compound per million parts of final formulation. The potted plants (one pot per compound) were placed on a revolving turntable and sprayed with 100–110 milliliters of test compound formulation by use of a DeVilbiss spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on plants infested with eggs. The sprayed plants were held at 80±5° F. and 50±5 percent relative humidity for six days, after which a microscopic examination was made of unhatched (dead) and hatched (living) eggs, and each test compound was rated according to the following designations:

5=70–100% mortality
3=40–69% mortality
1=0–39% mortality

*Mite systemic test*

Adults and nymph stages of the two-spotted mite (*Tetranychus telarius* (L.)), reared on tendergreen bean plants at 80±5° F. and 50±5 percent relative humidity, were the test organisms. Infested leaves from a stock culture were placed on the primary leaves of two bean plants six to eight inches in height, growing in a two-and-a-half inch clay pot. 150–200 mites, a sufficient number for testing, transferred from the excised leaves to the fresh plants in a period of twenty-four hours. The test compounds were formulated by diluting the stock suspension with water to give a suspension containing 250 parts of test compound per million parts of final formulation. Thirty milliliters of the test formulation were drenched into the pot containing the infested plants. The treated plants were held for forty-eight hours at 80±5° F. and 50±5 percent relative humidity. After the forty-eight hour holding period, microscopic examination for motile forms was made on the leaves o fthe test plants. Any individual capable of locomotion upon prodding was considered living. Each test compound was then rated according to the following designations:

5=80–100% mortality
3=40–79% mortality
1=0–39% mortality

*Nematocide test*

Ineffective migratory larvae of the root-knot nematode (*Meloidogyne incognita*, var. *acrita*), reared in the greenhouse on roots of Soleus plants constituted the test organism. Infected tomato plants were removed from the culture and the roots were chopped very finely. A small amount of these choppings was added to a pint Mason jar containing approximately 180 cubic centimeters of soil. The jar was capped and incubated for one week at room temperature. During the incubation period eggs of the nematode hatch and the larval forms migrate into the soil. The test compounds were formulated by diluting the stock suspension with water to give a suspension containing 1000 parts of test compound per million parts of final formulation. Twenty-five milliliters of the test formulation were added to each of two jars. Thus each jar contained 25 milligrams of test compound, an amount roughly equivalent to 75 pounds per acre. Following the introduction of the test formulation, the jars were capped and the contents thoroughly mixed on a ball mill for five minutes. The jars remained capped at room temperature for 48 hours whereupon the contents were transferred to 3-inch pots. These pots were then seeded wtih cucumber as an indicator crop and placed in the greenhouse where they were cared for in the usual fashion for approximately three weeks. The cucumber plants were removed from the pots and the soil was washed from the roots. The amount of galling was determined by visual inspection and rated according to the following designations:

5=no galling; perfect control
4=very light galling
3=light galling
2=moderate galling
1=severe galling, equal to untreated plants conducted to determine the concentration of chemical required to kill 50 percent of the insect or mite population in each of the above-described tests. This concentration, expressed in parts of test compound per million parts of applied formulation, is hereinafter abbreviated as $LD_{50}$. Similarly for those compounds which were effective for control of nematodes in the initial tests, serial dilution tests were conducted to determine the minimum concentration of chemical required to effect a rating of 3. This concentration, expressed in pounds of chemical per acre of soil, is hereinafter abbreviated as $ED_3$. The results are set forth in Table II, below.

TABLE II $LD_{50}$ ratings in p.p.m.

| Compound No. | Insecticidal Ratings | | | | Fly Bait | Miticidal Ratings | | | $ED_3$ Rating in lb./A Nematocidal Rating Root-Knot Nematode |
|---|---|---|---|---|---|---|---|---|---|
| | Bean Aphid | Army-worm | Mex. Bean Beetle Leaf Dip | Mex. Bean Beetle Systemic | | Mite Foliage | Mite Egg | Mite Systemic | |
| 1 | 4 | 500 | 70 | 8 | 4 | 15 | 1,000 | 5 | <4.8 |
| 2 | 3 | 600 | 40 | 5 | 3 | 12 | 1,000 | 15 | <4.8 |
| 3 | | | 80 | 25 | 8 | 100 | ~1,000 | ~150 | 4.8 |
| 4 | 30 | ~200 | ~100 | <4 | 6 | ~90 | | 30 | |
| 5 | ~50 | | | 60 | ~8 | ~180 | | 70 | 24 |
| 6 | ~12 | | | 30 | 110 | ~100 | ~1,000 | 40 | <19 |
| 7 | 1.5 | | | ~30 | 27 | 75 | ~1,000 | ~15 | <4.8 |
| 8 | 12 | | | ~250 | 125 | ~150 | | ~120 | 19 |
| 9 | <6 | | >100 | <15 | 60 | ~35 | | 5 | <4.8 |
| 13 | 12 | ~1,000 | | 45 | 10 | 400 | ~1,000 | | 8.4 |
| 14 | 12 | | | 120 | 25 | 500 | | | |
| 15 | 25 | ~1,000 | 125 | 7 | 30 | 300 | | 14 | <4.8 |
| 16 | | | >100 | 13 | 60 | 500 | | | 6.7 |

The results of the above-described tests are set forth in Table I, below.

The controls exhibited no pesticidal activity.

Compound 1,2-methyl-2-methylthiopropionaldehyde N-methylcarbamoyloxime, was further evaluated in a series of pot tests to demonstrate its systemic activity. In the

TABLE 1

| | Insecticidal Ratings | | | | Fly Bait | Miticidal Rating | | | Nematocidal Rating Root-Knot Nematode |
|---|---|---|---|---|---|---|---|---|---|
| | Bean Aphid | Army-worm | Mex. Bean Beetle Leaf Dip | Mex. Bean Beetle Systemic | | Mite Foliage | Mite Egg | Mite Systemic | |
| Concentration [1] | 100 | 1,000 | 100 | 250 | 1,000 | 1,000 | 1,000 | 250 | 75 Pounds/acre |
| Compound No.: | | | | | | | | | |
| 1 | 5 | 5 | 3 | 5 | 5 | 5 | 5 | 5 | 4 |
| 2 | 5 | 5 | 5 | 5 | 5 | 5 | 3 | 5 | 4 |
| 3 | 1 | 1 | 5 | 5 | 5 | 5 | 3 | 5 | 4 |
| 4 | 5 | 5 | 3 | 5 | 5 | 5 | 1 | 5 | 1 |
| 5 | 5 | 1 | 1 | 5 | 5 | 5 | 1 | 5 | 5 |
| 6 | 5 | 1 | 1 | 5 | 5 | 5 | 3 | 5 | 5 |
| 7 | 5 | 1 | 1 | 5 | 5 | 5 | 3 | 5 | 5 |
| 8 | 5 | 1 | 1 | 3 | 5 | 5 | 1 | 5 | 5 |
| 9 | 5 | 1 | 5 | 5 | 5 | 5 | 1 | 5 | 5 |
| 10 | 3 | 1 | 1 | 5 | 1 | 3 | 1 | 1 | 2 |
| 11 | 1 | 1 | 1 | 5 | 5 | 1 | 1 | 1 | 1 |
| 12 | 5 | 1 | 1 | 3 | 3 | 1 | 1 | 1 | 1 |
| 13 | 5 | 3 | 1 | 5 | 5 | 5 | 3 | 1 | 5 |
| 14 | 5 | 1 | 1 | 5 | 5 | 5 | 1 | 1 | |
| 15 | 5 | 3 | 5 | 5 | 5 | 5 | 1 | 5 | 4 |
| 16 | 1 | 1 | 5 | 5 | 5 | 5 | 1 | 1 | 5 |

[1] In parts of compound per million parts of applied formulation unless otherwise noted.

It can be seen that Compounds 1 to 3 differ only with respect to the extent of oxidation of the thio linkage, i.e. sulfide in Compound 1, sulfinyl in Compound 2, and sulfonyl in Compound 3, and that Compounds 1 to 3 all possess a high degree of insecticidal and miticidal activity. While we do not rely on any particular theory underlying the success of our invention, it can be convincingly postulated that the oxidized analogs of other 2-hydrocarbyl-sulfide-substituted compounds of our invention will possess high activity inasmuch as oxidation of the sulfur atom is a well-known metabolic pathway wherein the metabolic products possess activity.

For certain of our compounds, serial dilution tests were following tests, sufficient amounts of appropriate dilutions of the above-described stock suspension of Compound 1 were poured into pots containing the test plants to give the indicated concentration in milligrams of compound per pot. Unless otherwise noted, ratings are expressed as the degree of control of insect achieved as observed 72 hours after application of chemical, according to the following designations:

5=excellent control
3=fair control
1=no control

The results are given in Tables III and IV, below. In Table III, ratings for standard chemicals tested side-by-side with Compound 1 are also given.

TABLE III

*Comparison of Compound 1 with standards against bean aphids infesting nasturtium plants\* (systemic pot test)*

| Compound | Conc. (mg. active/2½ in. pot) | Rating |
|---|---|---|
| Compound 1 | 0.020 | 5 |
|  | 0.010 | 5 |
|  | 0.005 | 5 |
| O,O-diethyl O(and S)-2-(ethylthio)ethyl phosphorothioate. | 0.020 | 3 |
|  | 0.010 | 1 |
|  | 0.005 | 1 |
| O,O-diethyl S-2-(ethylthio)ethyl phosphorodithioate. | 0.020 | 1 |
|  | 0.010 | 1 |
|  | 0.005 | 1 |
| S-methylcarbamoylmethyl O,O-dimethyl phosphorodithioate. | 0.020 | 5 |
|  | 0.010 | 3-5 |
|  | 0.005 | 1 |
| O,O-diethyl S-ethylthio-methyl phosphorodithioate. | 0.020 | 3-5 |
|  | 0.010 | 1 |
|  | 0.005 | 1 |
| O,O-diethyl O-2-pyrazinyl phosphorothioate | 0.020 | 3 |
|  | 0.010 | 1 |
|  | 0.005 | 1 |

*Based on a starting population of approximately 150 aphids.

TABLE IV

*Systemic activity of Compound 1 against representative insects*

| Insect | Host Plant | Concentration | Rating |
|---|---|---|---|
| Pea Aphid | Windsor Bean | a 1.50 | 5 |
|  |  | a 0.75 | 5 |
|  |  | a 0.38 | 4 |
| Mealy Bug | Coleus | a .30 | c 5 |
|  |  | a 7.5 | c 5 |
|  |  | a 1.9 | c 3 |
| Mexican Bean Beetle | Tendergreen Bean | b 20 | d 100 |
|  |  | b 5 | d 93 |
| Armyworm Larvae | do | b 20 | d 100 |
|  |  | b 5 | d 100 | a Mg. active/4-inch pot.
b Mg. active/2½-inch pot.
c 48-hour rating.
d Expressed as percent kill.

In still another series of tests, Compound 1 was tested for activity against the serpentine leaf miner (*Liriomyza sp.*) in various modes of application.

In a systemic test, Compound 1 was applied, at the indicated concentrations, to soil in which were growing uninfested tendergreen bean plants. The plants were exposed to the adult insect and twenty-four days after application the number of miners infesting treated and untreated leaves were counted. The results were as follows:

| Concentration of chemical* | No. of miners on— | |
|---|---|---|
|  | Primary Leaves | Triplicate |
| 5 | 0 | 0 |
| 1.25 | 0 | 1 |
| 0 (control) | 64 | 29 |

*In milligrams per 2½ inch pot.

In a leaf dip test, tendergreen bean leaves already infested with the miners were dipped into variously diluted stock formulations of Compound 1. After treatment, the leaves were held in Petri dishes. The number of pupae formed was determined 72 hours after application and adult emergence was observed 2 weeks after application. The results were as follows:

| Concentration of chemical (p.p.m.) | Pupae Formation | Adult Emergence |
|---|---|---|
| 60 | 8 | 0 |
| 15 | 11 | 8 |
| 3.8 | 16 | 12 |
| 0 (control) | 80 | 67 |

The compounds contemplated in this invention may be applied as insecticides, miticides, and nematocides according to methods known to those skilled in the art. Pesticidal compositions containing the compounds as the active toxicant will usually comprise a carrier or diluent, either liquid or solid.

Suitable liquid diluents or carriers include water, petroleum distillates, or other liquid carriers with or without surface active agents. Liquid concentrates may be prepared by dissolving one of these compounds with a nonphytotoxic solvent such as acetone, xylene, or nitrobenzene and dispersing the toxicants in water with the aid of suitable surface active dispersing agents.

The choice of dispersing and emulsifying agent and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fullers earth, and the like. In the formulation of the wettable powders the aforementioned dispersing agents as well as lignosulfonates can be included.

The required amount of the toxicants contemplated herein may be applied per acre treated in from 1 to 200 gallons or more of liquid carrier diluent or in from about 5 to 500 pounds of inert solid carrier or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

The pesticides contemplated herein prevent attack by insects, mites, and nematodes upon plants or other material to which the pesticides are applied, and they have high residual toxicity. With respect to plants they have a high margin of safety in that when used in sufficient amount to kill or repel the insects, they do not burn or injure the plant, and they resist weathering which includes wash-off caused by rain, decomposition by ultra-violet light, oxidation, or hydrolysis in the presence of moisture or, at least, such decomposition, oxidation, and hydrolysis as would materially decrease the desirable insecticidal characteristic of the toxicants or impart undesirable characteristics, for instance, phytotoxicity, to the toxicants. The toxicants are so chemically inert that they are compatible with substantially any other constituents of the spray schedule, and they may be used in the soil, upon the seeds, or the roots of plants without injuring either the seeds or roots of plants, yet by imbibition or root uptake they will kill the pests feeding thereon.

What is claimed is:

1. A compound of the formula

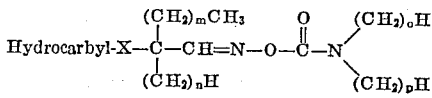

wherein the hydrocarbyl radical contains not more than 7 carbon atoms and is selected from the group consisting of alkyl, alkenyl, alkynyl, aralkyl, aryl, chloroaryl, and alkaryl; X represents a sulfur linkage of the group consisting of thio, sulfinyl, and sulfonyl linkages; and wherein $m$, $n$, $o$, $p$ are integers from 0 to 4 with the proviso that neither the sum of *m* and *n* nor the sum of *o* and *p* exceeds 4.

2. 2 - alkyl-2-alkylthiopropionaldehyde N-methylcarbamoyloxime where the alkyl and alkylthio contain from 1 to 4 carbon atoms each.

3. 2 - alkyl-2-alkylsulfinylpropionaldehyde N-methylcarbamoyloxime where the alkyl and alkylsulfinyl contain from 1 to 4 carbon atoms each.

4. 2 - alkyl-2-alkylsulfonylpropionaldehyde N-methylcarbamoyloxime where the alkyl and alkylsulfonyl contain from 1 to 4 carbon atoms each.

5. 2 - alkyl-2-methylthiopropionaldehyde N-methylcarbamoyloxime where the alkyl is of from 1 to 4 carbon atoms.

6. 2 - methyl-2-alkylthiopropionaldehyde N-methylcarbamoyloxime where the alkyl is of from 1 to 4 carbon atoms.

7. 2 - methyl-2-methylthiopropionaldehyde N-methylcarbamoyloxime.

8. 2-methyl-2-methylsulfinylpropionaldehyde N-methylcarbamoyloxime.

9. 2-methyl-2-methylsulfonylpropionaldehyde N-methylcarbamoyloxime.

10. 2 - methyl - 2-methylthiobutyraldehyde N-methylcarbamoyloxime.

11. 2-methyl-2-ethylthiopropionaldehyde N-methylcarbamoyloxime.

12. 2 - methyl-2-(2-propenylthio)propionaldehyde N-methylcarbamoyloxime.

13. 2-methyl-2-methylthiopropionaldehyde carbamoyloxime.

14. 2-methyl-2-methylthiopropionaldehyde N-ethylcarbamoyloxime.

References Cited by the Examiner
UNITED STATES PATENTS 2,496,198  1/50  Butterbaugh.
2,786,865  3/57  Copenhaver.

FOREIGN PATENTS 824,534  12/59  Great Britain.

OTHER REFERENCES

Exner, C. A., vol. 52, p. 19,894 (1958).
Zinner, C. A., vol. 53, p. 13,999 (1959).

CHARLES B. PARKER, *Primary Examiner.*